United States Patent
Goldman et al.

(10) Patent No.: US 6,615,405 B1
(45) Date of Patent: Sep. 2, 2003

(54) METHOD AND SYSTEM FOR DISTRIBUTING AND MAINTAINING SOFTWARE ACROSS A COMPUTER NETWORK

(75) Inventors: Dov J. Goldman, White Plains, NY (US); Peter A. Spiro, Chappaqua, NY (US)

(73) Assignee: Power Quest Corporation, Orem, UT (US)

( * ) Notice: Subject to any disclaimer, the term of this patent is extended or adjusted under 35 U.S.C. 154(b) by 0 days.

(21) Appl. No.: 09/478,461

(22) Filed: Jan. 6, 2000

(51) Int. Cl.$^7$ ............................................. G06F 9/445
(52) U.S. Cl. ..................... 717/174; 717/177; 717/178
(58) Field of Search .................... 717/174, 175, 717/176, 177, 178, 168, 170, 171; 709/203

(56) References Cited

U.S. PATENT DOCUMENTS

| | | | | |
|---|---|---|---|---|
| 5,008,814 A | * | 4/1991 | Mathur | 709/221 |
| 5,919,247 A | | 7/1999 | Van Hoff et al. | 709/217 |
| 5,933,646 A | | 8/1999 | Hendrickson et al. | 395/712 |
| 5,933,647 A | * | 8/1999 | Aronberg et al. | 717/178 |
| 5,974,454 A | | 10/1999 | Apfel et al. | 709/221 |
| 6,023,584 A | * | 2/2000 | Barton et al. | 717/177 |
| 6,023,586 A | * | 2/2000 | Gaisford et al. | 717/178 |
| 6,038,399 A | * | 3/2000 | Fisher et al. | 717/178 |
| 6,049,671 A | * | 4/2000 | Slivka et al. | 717/173 |
| 6,144,992 A | * | 11/2000 | Turpin et al. | 709/208 |
| 6,163,859 A | * | 12/2000 | Lee et al. | 714/38 |
| 6,202,070 B1 | * | 3/2001 | Nguyen et al. | 707/104.1 |
| 6,256,668 B1 | * | 7/2001 | Slivka et al. | 709/220 |
| 6,272,536 B1 | * | 8/2001 | van Hoff et al. | 709/217 |
| 6,282,712 B1 | | 8/2001 | Davis et al. | 717/11 |
| 6,377,951 B1 | * | 4/2002 | Campbell | 707/10 |
| 6,457,076 B1 | * | 9/2002 | Cheng et al. | 710/36 |
| 6,496,875 B2 | * | 12/2002 | Cheng et al. | 710/1 |

OTHER PUBLICATIONS

Hart, "Electronic delivery of software, implementation of a rebust, effective solution", ACM SIGUCCS, pp 177–178, Nov. 2002.*
Morris III et al., "Accurate data redistribution cost estimation in software distributed Shared memory system", ACM PPOPP, pp 62–71, Jun. 2001.*
Dongarra et al., "Software distribution using Xnetlib", ACM Trans. on Mathematical SW, vol. 21, No. 1, pp. 79–88, Mar. 1995.*
Korel et al, "Version management in distributed network environment", ACM pp 161–166, 1991.*
Tanenbaum, Andrew S., *Distributed Operating Systems*, Chapter 5: "Distributed File Systems"; copyright date 1995.
"Systems Management Server Version 2.0: Technical Comparison of Systems Management Serve 2.0 and Novell's ZENworks 2.0"; copyright date 2000.

* cited by examiner

*Primary Examiner*—Anil Khatri
(74) *Attorney, Agent, or Firm*—Computer Law++

(57) ABSTRACT

A method and system are provided for installing software on microprocessor based devices accessible over a computer network. The method includes, identifying component data associated with a software application using a first electronic device; generating a first server update algorithm by comparing the component data against data present on a first server and executing the first server algorithm thereby duplicating the component data on the first server; generating a second server update algorithm by comparing the component data on the first server against data present on a second server and executing the second server algorithm thereby duplicating the component data on the second server; generating a second device update algorithm by comparing the component data on the second server to data present on a second device and installing the software application on the second device by executing the second device update algorithm.

20 Claims, 6 Drawing Sheets

METHOD AND SYSTEM FOR DISTRIBUTING AND MAINTAINING SOFTWARE ACROSS A COMPUTER NETWORK

RELATED APPLICATIONS

The present invention is related to copending, commonly assigned patent application Ser. No. 09/067,655 entitled SYSTEM AND METHOD USING TOKEN PROCESSING TO CONTROL SOFTWARE DISTRIBUTION AND DESKTOP MANAGEMENT IN A COMPUTER NETWORK ENVIRONMENT and commonly assigned U.S. Pat. No. 5,933,647 entitled SYSTEM AND METHOD FOR SOFTWARE DISTRIBUTION AND DESKTOP MANAGEMENT IN A COMPUTER NETWORK ENVIRONMENT, the entire disclosures of which are hereby incorporated by reference as if being set forth herein in their respective entireties.

FIELD OF INVENTION

The present invention relates to software distribution and maintenance methods and systems and more particularly to an improved scalable and efficient method and system for distributing and maintaining software applications across a network of electronic devices.

BACKGROUND OF INVENTION

A complete software distribution and management system for a plurality of microprocessor-based devices coupled to an electronic network requires features such as effortless distribution of software and effortless maintenance of that software. As is well known, software applications often include multiple components which are stored as individual files. Installation of a software application to multiple devices typically requires copying each of these files to each device and sometimes, making appropriate changes to data already present on the device. For example, in the case of a Microsoft Windows application, directories often need to be created and environmental changes often need to be performed. It is common that many of these directories, individual files and environment changes are used by more than one application and are hence shared.

A particularly well suited method for identifying each of the files and changes is illustrated in commonly assigned U.S. Pat. No. 5,933,647, entitled "SYSTEM AND METHOD FOR SOFTWARE DISTRIBUTION AND DESKTOP MANAGEMENT IN A COMPUTER NETWORK ENVIRONMENT," issued Aug. 3, 1999.

The '647 patent teaches a system for distribution of a software in a customized configuration to a computer in network environment. The system includes a console means for creating distribution control information which is both associated with the software and related to the customized configuration. A server responsive to the console stores the software and the distribution control information. Electronically linked to the server is an agent for downloading the software from the server means, in accordance with the distribution control information. The agent means resides on the microprocessor-based device which downloads the software.

The '647 patent teaches a system wherein software distribution and desktop management is performed from the workstation running the console component which includes an administrator. The workstation running the console is linked to a file server which in turn is linked to workstations running the agent components. It is noted according to the '647 patent application profiling occurs on the console, the profile is stored on the file server, and the profile is distributed to the agents. The profile is a set of instructions to target devices on how to install an application.

The '647 patent teaches using typical hardware elements including a workstation and a file server, and respective software elements which configure the hardware elements for operation. Software distribution is controlled by the administrator which profiles an application. The profile is stored in a database on a file server. The administrator schedules a distribution of the application, i.e., profile, using the scheduler, and specifies which agent based target devices should receive the application using a condition builder. Each agent detects a newly scheduled application, and evaluates the condition for distribution to see if the distribution to it is appropriate. If the distribution is appropriate for a particular agent, that agent pulls down the distribution, i.e., the agent performs the actual distribution. If the distribution is not appropriate for a particular agent, then that agent goes back to sleep, i.e., does not perform a distribution.

A profile or application is made up of individual "actions". The user may edit the action, edit the condition attached to the action, delete the action, or perform a "search and replace" on the action. One problem with such a system is that it is not readily scalable, as the file server can be rapidly overrun with distribution requests.

Further, it should be recognized scalability is important in data distribution systems of this type. Generally, scalability refers to how well a system can adapt to increased demands. Scalability is an important feature because one can invest in and develop a system according to the present invention with confidence it won't be quickly outgrown. It is an object of the present invention to provide scalability to these types of systems.

SUMMARY OF INVENTION

A method and system for installing software on a plurality of microprocessor based devices each being accessible over a computer network, said method comprising: identifying component data associated with a software application using a first electronic device; generating a first server update algorithm by comparing said component data against data present on a first server and executing said first server algorithm thereby duplicating said component data on said first server; generating a second server update algorithm by comparing said component data on said first server against data present on a second server and executing said second server algorithm thereby duplicating said component data on said second server; generating a second device update algorithm by comparing said component data on said second server to data present on a second device and installing said software application on said second device by executing said second device update algorithm.

DETAILED DESCRIPTION OF THE INVENTION

Figure 1:
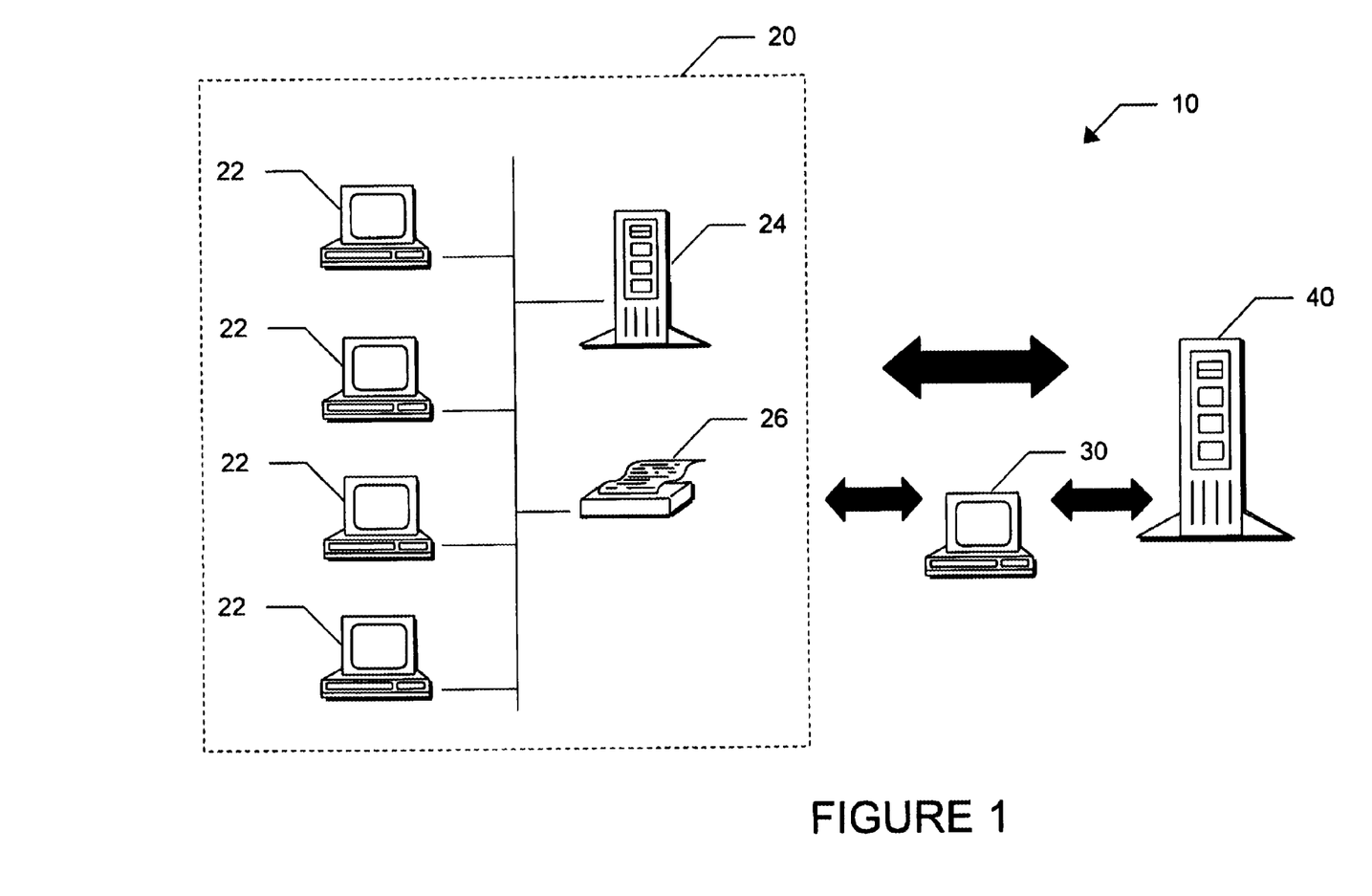
FIG. 1 illustrates an overview of a computerized network utilized according to a preferred embodiment of the present invention.

Referring now to the figures, like references identify like elements of the invention. FIG. 1 illustrates an overview of a computerized system 10 in which the present invention can be implemented. The system 10 is representative of any computerized network, i.e. intranet, the Internet, etc. The particular composition of system 10 is intended for illustrative purposes only. System 10 is illustrated to include Local Area Network ("LAN") 20, device 30 and server 40. LAN 20 is illustrated to include devices 22, server 24 and peripheral 26 being conventionally interconnected. In the embodiment of FIG. 1, devices 22 and 30 are illustrated in the form of Microsoft Windows based personal computers, however it should be understood alternatives contemplated for any or all devices 22 and 30 include personal computers using other operating systems, Sun Solaris-based workstations, Personal Digital Assistants such as a Palm Computing PalmPilot, a "smart" cellular phone or any other microprocessor based device. Additionally, the peripheral 26 of FIG. 1 is illustrated to be a printer, however one or more conventional peripherals could of course be attached to LAN 20 as is well known and understood. As is also known and understood, the LAN 20, device 30 and server 40 are communicable with one another. Interconnections may take the form of direct links over telephone lines or cellular links, or any other suitable means such as cable modems for example, as well as through the global interconnection of computers and computer networks commonly referred to as the Internet.

There are three primary aspects of the present invention: data input, data staging, and application delivery and installation. As used herein, the term "data input" generally refers to the logging of changes which must be performed in order for a software application to be successfully installed, for example files to be duplicated and supporting data to be stored. For example, certain directories may need to be present, certain files may need to be present in those directories and certain environmental conditions must exist. As used herein, the term "data staging" generally refers to duplicating data which has been successfully input to additional servers which are better positioned to more efficiently deliver an application for installation to a particular targeted device or control the distribution. This provides scalability, and, as used herein the term "application delivery" generally refers to providing information and data which must be present for successful installation of an application to a targeted device upon which it is to be installed.

Figure 2:
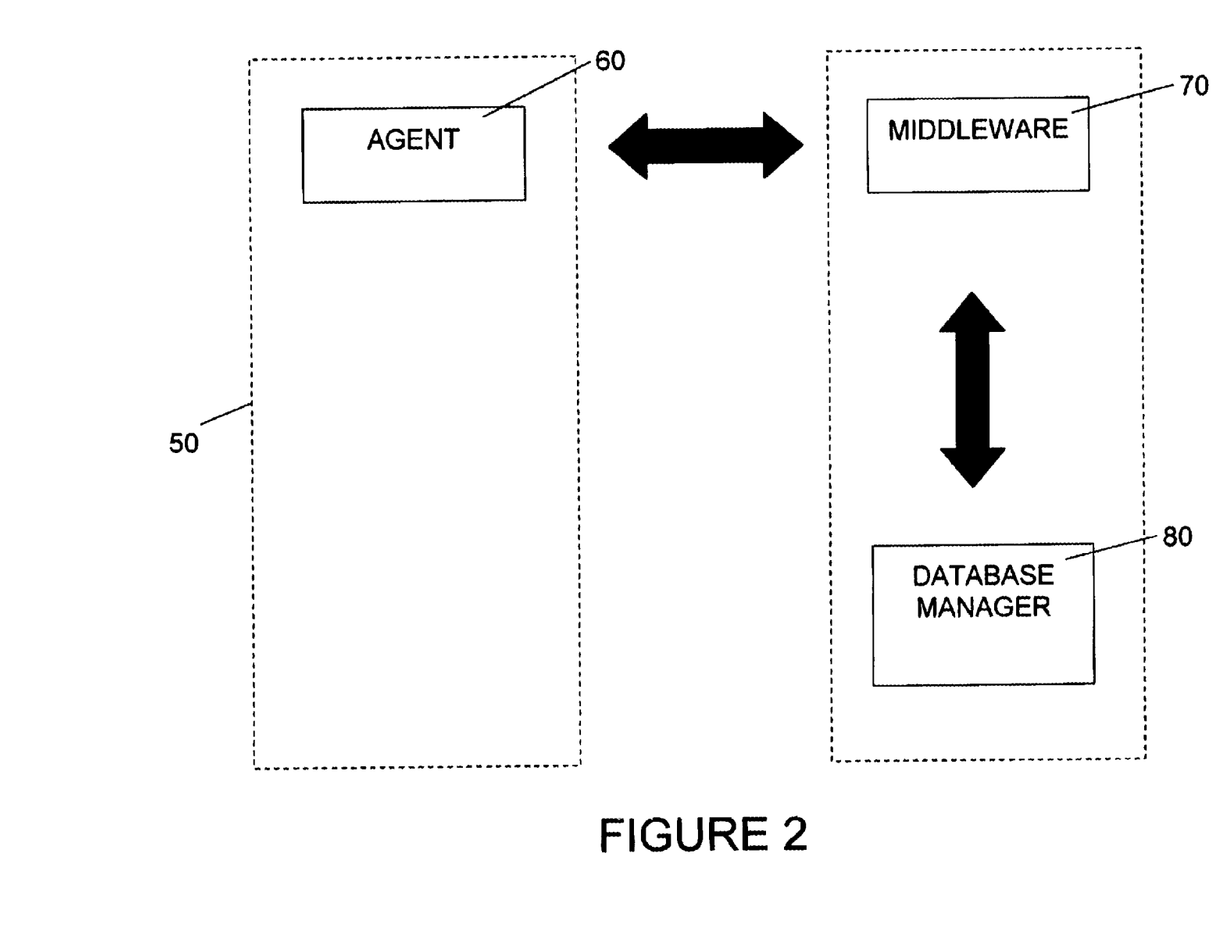
FIG. 2 illustrates an examplematic system configuration which can be utilized according to the present invention.

Referring now also to FIG. 2, the present invention can be seen therein to comprise mainly three elements: a "console" 50 which includes an agent application 60 running on a device such as 22 or 30 (FIG. 1), a "middleware" layer 70 and a relational database and database manager 80. Generally, the console 50 is a computer workstation (i.e. devices 22 and 30) loaded with an agent 60 which accesses a repository for data input, modification and monitoring purposes. A repository server is a computer server (i.e. servers 24 and 40 of FIG. 1) having storage set aside for application component files and environmental change data (file-store) and a relational database for storage of control information. The middleware layer 70 is preferably executed on a repository server and communicates with consoles and distribution targets. The middleware layer 70 further communicates with a relational database manager and database 80 to respectively store and retrieve control information to and from the relational database. It also stores and retrieves files in the file-store. The repository server function may be divided among multiple computer servers with the middleware layer 70 and file-store resident on one, and the relational database manager and relational database 80 resident on a second for example. Basically, the present invention comprises a 3-tier configuration, or in other words three layers of software are utilized according to the present invention: an agent application 60 (resident on a targeted device 22 or 30 for example which each together with an agent application comprise a console 50, respectively), the middleware layer 70 and the relational database and manager 80. A staging engine links to a repository server and communicates with a peer staging engine linked to another repository server. A staging engine replicates installation data for software applications and control data from a given repository server to one or more peer repository servers. For example, servers 40 and 24 may each include a staging engine that links respective database managers and databases 80 thereof together, i.e. provides synchronization. As set forth, a targeted device is a microprocessor based device such as a Windows based PC, a Sun Solaris-based workstation, a Palm Computing PalmPilot, a "smart" cellular phone or any other compatible microprocessor based device. The targeted device receives software distributions from a repository server. An agent 60 running on a targeted device (i.e. 22, 30) preferably pulls down jobs by requesting them and installs new software or performs appropriate file replacement for example. The network connection can take the form of a Local Area Network ("LAN"), Wide Area Network ("WAN"), Internet or Dial-up link between a console and the repository server, any two staging engines or any number of targeted devices and a repository server.

Figure 3:
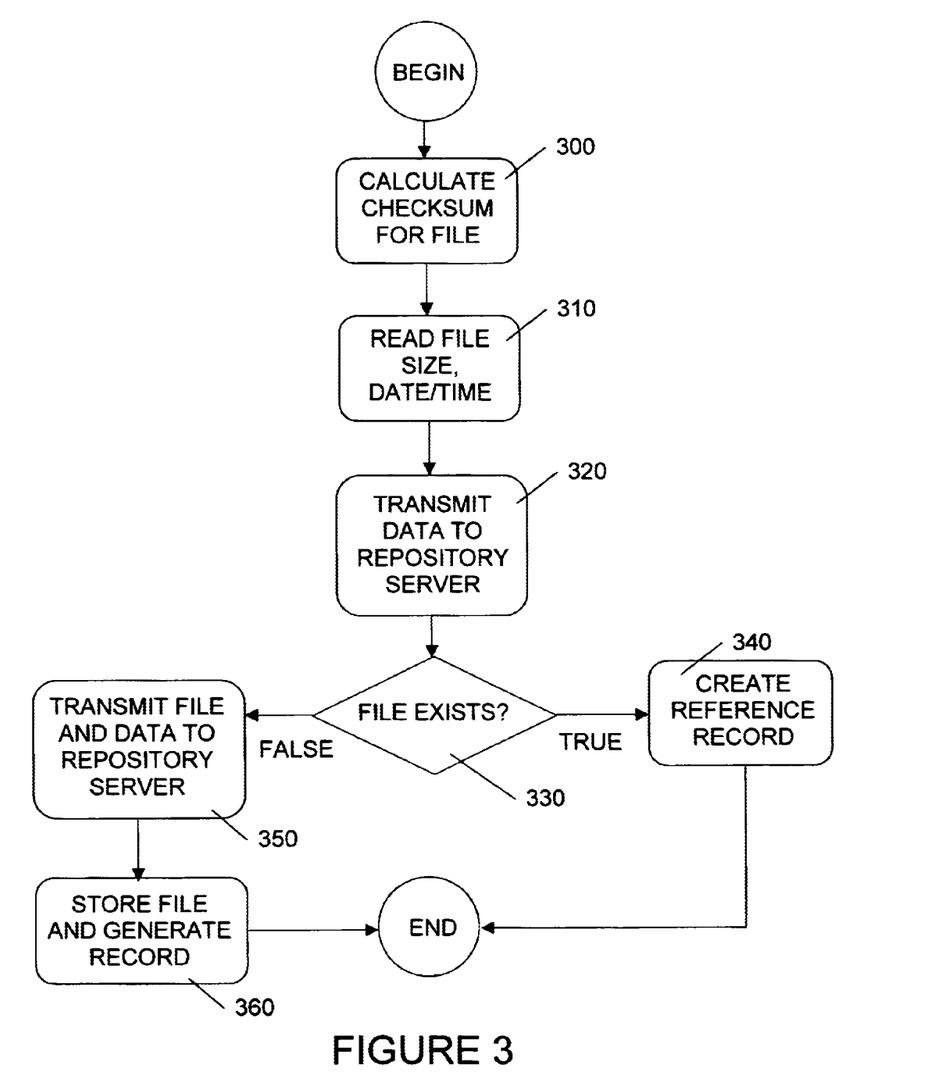
FIG. 3 illustrates a flow diagram of data input according to the present invention.

Referring now also to FIG. 3, therein is illustrated a preferred method for preparing new applications for distribution according to the present invention. Using a console 50 (FIG. 2), new software packages are input into the repository for distribution. Several methods could be used for input, including but not limited to manual importing of each element (file) and environmental change, importation of an entire application stored in a portable package format (OSD or WinInstall for example) or automated capture using snapshot/delta technology, for example. Referring again to the '647 patent method for a Microsoft Windows based personal computer for example, according thereto (i.e. 30) a device scans the entire registry, and creates a list of all entries and values. More particularly, during a pre-scan, the device scans all files on the hard drive and creates a list specifying the name, date, time, and size of each file. The device backs up the autoexec.bat file, the config.sys file, and all ".ini" files in the Windows directory. During the post-scan, the system scans the entire registry. For each entry in the registry, it looks for a corresponding entry in the copy of the registry that was saved during the pre-scan. If no corresponding entry is found, or if the entry has changed, we know this is a new registry entry and the system adds it to the profile. The system also scans all files again on the disk. For each file, it looks to see if that file is stored in the list that was created during the pre-scan. If not, or if the date, time, or size of the file has changed since the pre-scan, the system adds this file to the profile. The system examines the autoexec.bat, config.sys, and all ".ini" files in the Window directory. For each of these files, it compares the file to a copy of the file that was saved during the pre-scan. If the file has changed, the new text, i.e. the changes in these files, are added to the profile. As stated however, other method could of course be utilized.

According to the present invention, the following steps are iterated for each file or change logged (in other words, is iterated one time for each file and environmental change associated with an application, i.e. profile entry), regardless of what the data source is.

For each file associated with an application using the console 50 (device 30 for example) a checksum is calculated 300. The console 50 also reads the file size, date and time stamp 310. The console 50 then passes or transmits the file name, checksum, file size, date and time stamp 320 to a repository server 40, along with an identification code of the application being captured by the console 50. The repository server 40 in turn queries 330 the relational database using database manager 80 to determine if the file exists in its file-store (which may or may not be locally present on server 40). The repository server 40 returns true if the file exists and its checksum, file size, date and time stamp match those of the file on the transmitting console 50 precisely (i.e. is an exact match), and then records or creates a reference record 340 (relational link) containing the ID of the existing file (File ID) and the ID of the new application (Application ID). If the file exists, processing is complete after creation of the reference record which associates the existing file with the new application as well 340. If the file does not exist, the repository server returns false and the transmitting console 50 (i.e. device 30) transmits 350 to the repository server, the new file, along with its checksum, file size, date and time stamp, as well as the new application ID. The repository server 40 preferably stores 360 the file in its file-store and creates a new File ID and a reference record containing the File ID and the Application ID. Other records are generated for environmental changes and new directories for example along with the necessary data to implement them.

For each environmental change, data sufficient to enact the change is stored in lieu of a "file" itself. The repository is searched to identify if that change already exists or not and analogous processing follows.

As set forth, the present invention utilizes staging engines, or duplicate middleware layers and/or repositories to provide scalability. Each middleware layer and/or repository server can be updated analogously to initial data input according to the present invention. Accordingly, additional staging engines, or nodes, can be readily added to increase system capacity without decreasing overall system performance.

Figure 4:
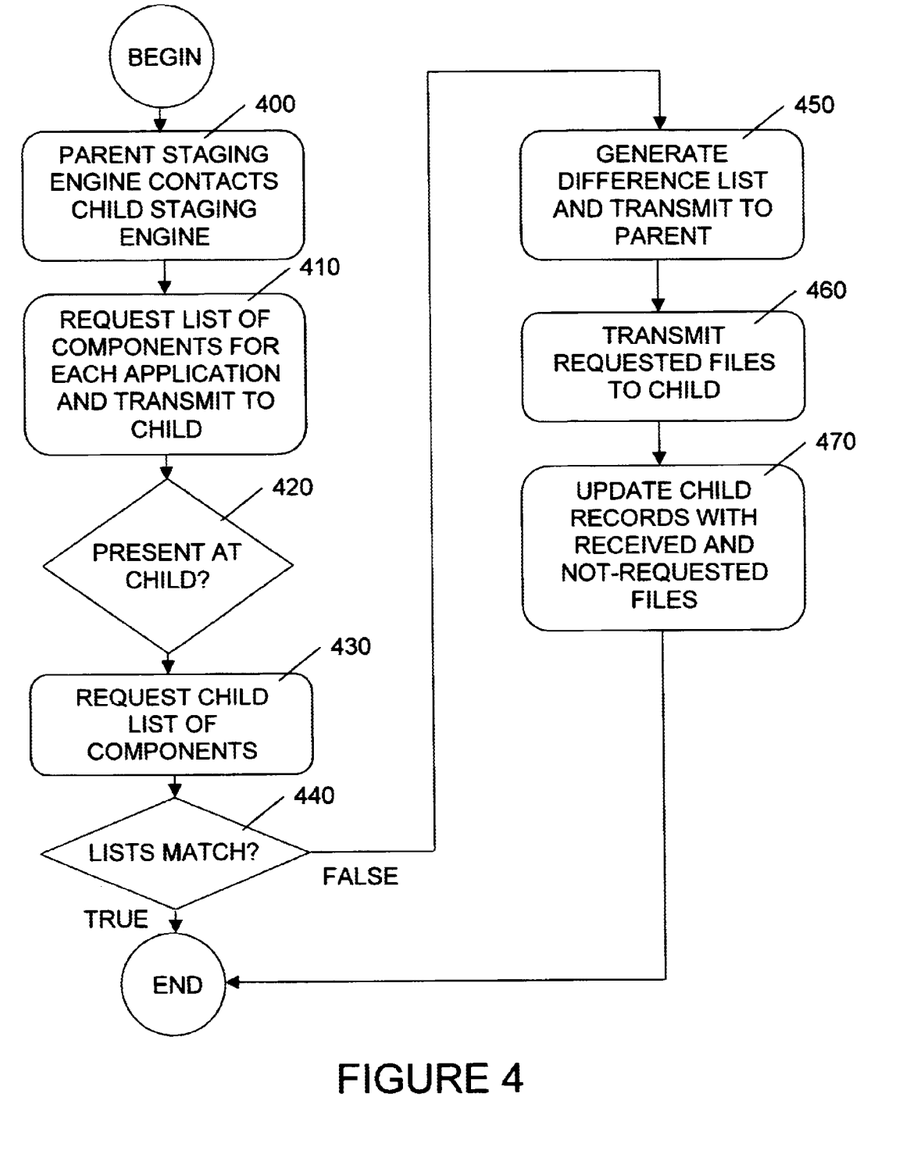
FIG. 4 illustrates a flow diagram of data staging according to the present invention.

Referring now also to FIG. 4, using the staging engine, application data and file components are transmitted from a centralized repository server (i.e. a parent repository server, in this case server 40 for example) to a remote repository server better positioned to efficiently deliver the application to targeted devices (i.e. in the case of devices 22, data is duplicated from repository server 40 to repository server 24). According to the preferred embodiment, this data is transmitted the first time and/or updated for changes using the following steps.

Using a database-stored schedule, a "parent" Repository's Staging Engine contacts 400 a "child" Repository's Staging Engine using TCP/IP communications (i.e. the Staging Engine of server 40 contacts the Staging Engine of server 24). Of course other communications techniques or protocols could be used as well though. The parent Repository's database (for sake of example stored on server 40) contains a list of the applications to be staged (replicated or updated) to the child server (in this examplematic case 24). The parent Staging Engine iterates through each of the applications on the list. For each application to be replicated or updated, the parent Staging Engine requests 410 a list ("Master Application Bill of Materials") of the application's components using database manager 80. The requested list includes files as well as changes to the operating environment (in the case of Microsoft Windows applications, these typically include registry and ".ini" file entries and shortcuts and directories, among others). The parent Staging Engine then transmits 410 this list to the child Staging Engine. The child Staging Engine queries 420 its local repository to see if the application is present, and generates 430 a list of the components ("Slave Application Bill of Materials") stored in it. The child staging engine compares 440 the Master Application Bill of Materials to the Slave Application Bill of Materials, determining the differences. A new list ("Application Component Request List") is generated 450 and forwarded to the parent Staging Engine. This new list includes all of the components (i.e. files and environmental changes for example) needed to properly install the application or maintain proper operation of or update the application for example. It should be noted, even if an application is not present on the child repository server, it is unlikely every file and change which is associated with the application will need to be transmitted to the child repository. For example, it is very common for Microsoft Windows applications to share files. Accordingly, if a parent is staging a first application to a child that already includes data for a second application, some of the files which the parent associates with the first Application will likely be already present on the child and will not need to be duplicated. The parent Staging Engine iterates through the Application Component Request List, transmitting 460 each requested component file or environmental change data to the child staging engine. Upon receipt of the component files and other data, the child staging engine records the master application bill of materials using the database manager and database 80. For each file and change referenced but not received (because it was already in the child Repository file-store), the child repository server associates the existing file or change data with the application (i.e. creates 470 a reference record in its relational database containing the File ID and Application ID). For each new file received, the repository server creates 470 a new File ID. It then stores the file and creates a reference record (in the relational database) containing the File ID and Application ID which cross references the file to the associated application.

Figure 5:
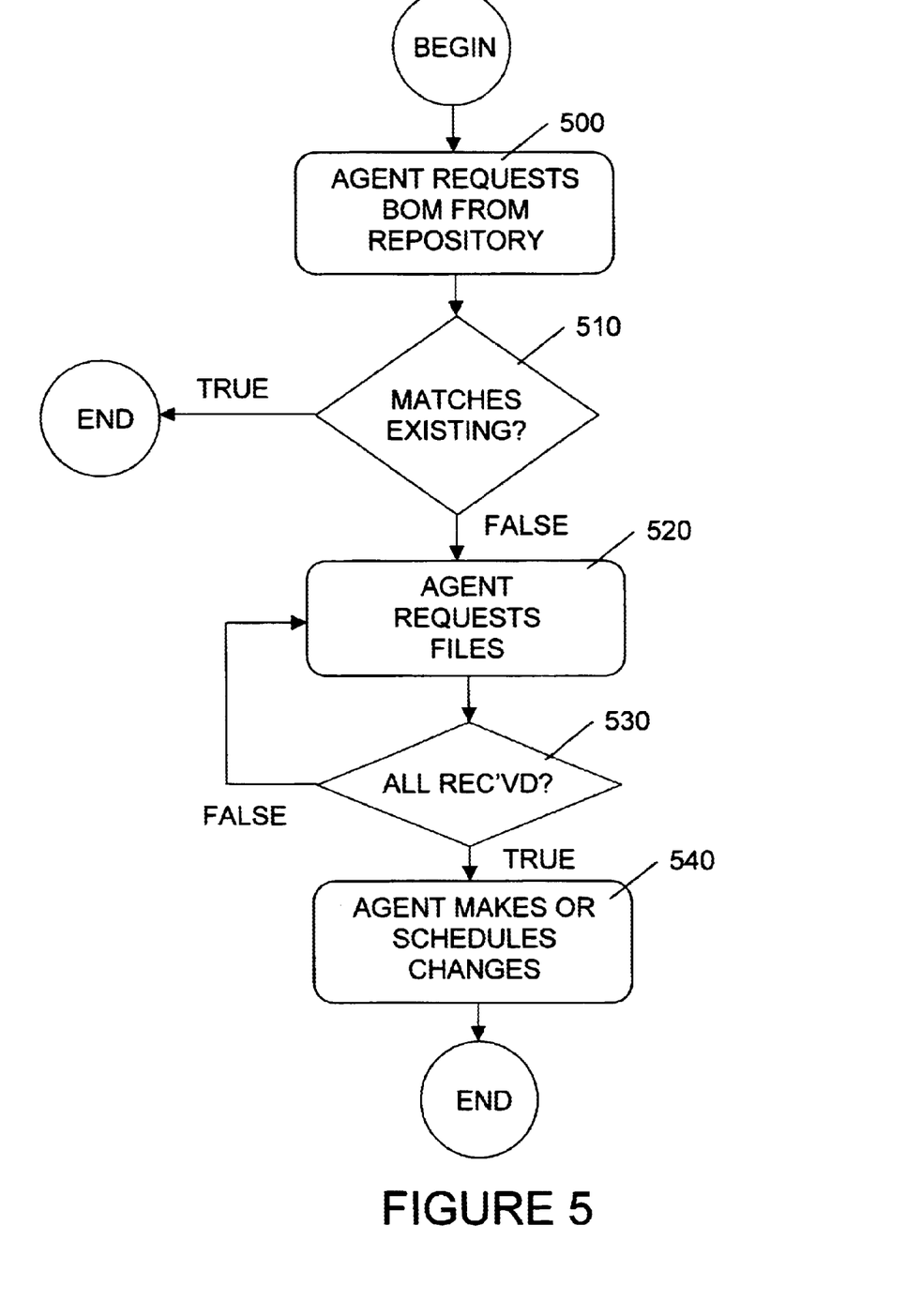
FIG. 5 illustrates a flow diagram of application delivery and installation according to the present invention.

Application delivery is preferably performed in accordance with the following steps. Referring now also to FIG. 5, an Agent 60 application preferably begins a "pull" of software application components either on a polling basis (when it evaluates a list of potential jobs and selects the ones appropriate for the machine/user i.e. 22, 30) or by direct command via TCP/IP protocol packet (when an Agent 60 is directed by the repository server 24 to perform a particular job for example). An Agent 60 requests 500 an Application Bill of Materials from the repository server (i.e. 24). The Agent 60 compares 510 the required file components and environmental changes against the files and environment that exist on the device using file name, checksum, file size, date and time stamp as data points. The Agent 60 requests 520 and the repository server transmits the file components and change data not present on the device one file or change at a time. The files and changes are preferably cached in a holding area. If transmission is interrupted at any point (by a communication outage for example), the download restarts at the point it left off. Once all of the file components have been received 530 the Agent makes 540 each environment change required and moves the files to the proper locations. Optionally, the installation may be scheduled to occur upon the next boot-up sequence or upon a signal from an administrator (to allow for network wide synchronization of a new application version, for example).

As an option to speed processing, the transmission of updates for an application may be performed by using transaction logging. In other words, every time an insert, modify or delete operation is performed on the repository, the repository server generates a date/time-stamped log record. During staging of updates to existing applications, the staging engines are directed to deliver only the updates made (according to the parent repository server's transaction log) since the last successful staging. As updates are received, each one is entered in the child repository server's transaction log. In this way a parent server 40 can update child server 24.

Figure 6:
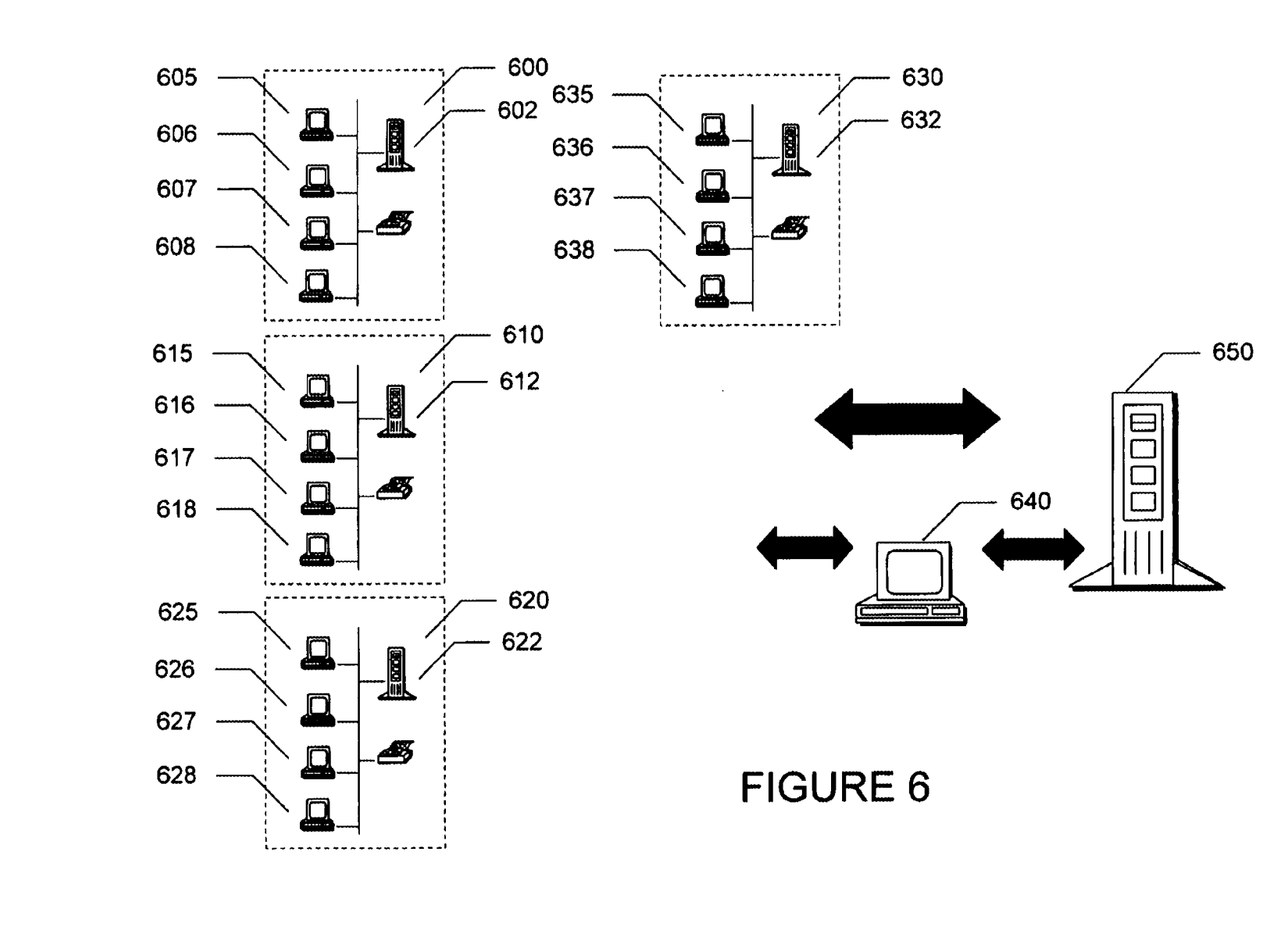
FIG. 6 illustrates an overall system according to a preferred form of the invention.

Accordingly, multiple mirror servers can be created to provide scalability in the system according to the present invention. It should also be noted, according to a preferred form of the invention, data staging is preferably a "push" application in contrast to delivery which is preferably a "pull" application. Accordingly, an administrator of a system according to the present invention can identify which child staging engines to update with a new or updated application according to business relationships, contracts, etc. Referring now also to FIG. 6, a first entity operating LAN 600 may be entitled to use a software application a second entity operating another LAN 610 is not. Accordingly, the administrator can easily identify the child server 602 to be a target for parent staging engine 650 but server 612 associated and accessible by the second entity not to be. In this way, a system administrator using a console which includes device 640 can update a parent repository server 650 with applications and data associated with LANS 600, 610, 620, 630. Each LAN 600, 610, 620, 630 which should be provided access to a given application is provided such access through local server 602, 612, 622, 632 respectfully. By "pushing" the application to select ones of servers 602, 612, 622, 632, select ones of LANS 600, 610, 620, 630 can be selectively provided access to the application. It should be understood the use of multiple LANS is not required as long as individual devices 605–608, 615–618, 625–628 and 635–638 are communicable with associated servers 600, 610, 620, 630 which are in turn communicable with server 650.

Applications may be checked and damages repaired simply by reexecuting the installation process. Only damaged or missing components can be downloaded and reinstalled without any modification to the algorithm described above.

Advantages of the invention include that it avoids storage and transmission of duplicate components, resulting in a savings in disk space, network bandwidth and transmission time. Many software packages use common elements, such as Dynamic Link Libraries (DLL's). The method and system according to the present invention stores and transmits a single copy of each duplicated element, as opposed to conventional systems which typically maintains a copy of each element for each software application requiring it. As a result, the present invention makes possible the efficient delivery of software over a network such as a corporate intranet or even over a global interconnection of computers and computer networks such as the Internet.

A further advantage results from avoiding the installation of duplicate components on targeted devices, thus reducing transmission time for installation components. If a computer receiving a new application (Microsoft Outlook, for example) already has another software package from the same publisher (Microsoft Office, for example), it will almost certainly already have some of the components required for the new application. According to the present invention, because each file and environment is independently evaluated, the present system determines the existence of common elements and avoids re-transmitting them. Further, because conventional systems deliver an entire package during each distribution, they require high bandwidth. In contrast, the system and method according to the present invention reduces redundancies to its advantage and shortens transmission time. As a result, the present invention makes possible the efficient deployment of software applications over relatively slow dial-up or Internet connections for example.

A further advantage lies in that the present invention facilitates quick repair of damaged applications. Because the present method and system stores detailed data on the desired state of the components of a software application, it facilitates efficient repair of applications that have failed because components are no longer at the desired state. For example, if a package requires a particular version of a "DLL" file, and the installation by the user of another application causes a different version of that "DLL" file to be copied to the system, the original package might cease functioning. A system according to the present invention can effectively "heal" a software package by searching for damaged or overwritten components upon demand (by a user, administrator or by automatic execution on a timed, repeated basis for example). Unlike conventional systems that would need to deliver the entire package for this operation, according to the present method, the system re-delivers and repairs only the effected components. Thus, it is advantageously usable over relatively slow connections or links, such as dial-up and certain Internet connections for example.

Yet a further advantage resides in that a system according to the present invention enables cross referencing of duplicate or overlapping application components. As set forth, many applications share components (for example, in the Windows environment "DLL" files are commonly shared elements). In some cases the shared components are identical, but in many instances they are not. Many Windows applications will require a DLL file with a given name, but with different internal composition (for example, a newer version with slightly different program code). Two applications which require the exact same DLL file will coexist properly on a given computer, but if they require different versions of a commonly shared DLL, they could cause a conflict. This invention detects subtle differences in what appears to be the same file, and permits reporting on these potential conflicts so that they may be identified and managed or avoided. It either prevents the conflict, or empowers technical staff to manage it, preventing computer downtime.

Further yet, the present system and method requires no network Operating System ("OS") or File Sharing infrastructure. Conventional distribution algorithms require an external method for sharing and/or copying files. They typically "download" a package file, which contains the components of an application from a file server or a website. This often entails security permissions which must be granted to the user of the workstation to enable access to a file system containing the software to be distributed. The current method and system obviates the need for any file sharing or copying mechanism, as all files and other data are transmitted directly from machine to machine over the TCP/IP protocol via Remote Procedure Calls. In other words, according to the present invention, by including a mechanism for direct file transmission (1 file at a time) over native TCP/IP connections, file delivery can be effectively and efficiently accomplished without the need for any other infrastructure. Thus the user of a targeted device need not be granted permission to access a file server.

The present invention is effective over slow and unreliable connections because the distribution of software is accomplished in a component by component fashion (as opposed to the delivery of a monolithic "package file"). Accordingly, the present invention lends itself to techniques such as checkpoint restart, in which an interrupted transmission is resumed at a later time from the point at which it was stopped. Methods and systems that lack this capability will either restart from the beginning of a large transmission each time communications are lost, or deliver the package in a damaged state.

I claim:

1. A method for installing software on a plurality of microprocessor based devices each being accessible over a computer network, said method comprising:

identifying component data associated with a software application using a first electronic device;

duplicating said component data on a first server by generating a first server update algorithm by comparing said component data against data present on said first server and executing said first server algorithm;

duplicating said component data on a second server by generating a second server update algorithm by comparing said component data on said first server against data present on said second server and executing said second server algorithm; and, generating a second device update algorithm by comparing said component data on said second server to data present on a second device and installing said software application on said second device by executing said second device update algorithm.

2. The method of claim 1, wherein said generating said first server update algorithm comprises:

communicating said component data from said first microprocessor-based device to a first server using said computer network; and, identifying which of said component data is not available to said first server.

3. The method of claim 2, wherein said executing said first server algorithm comprises:

requesting said component data that is not available to said first server from said first microprocessor-based device using said computer network;

communicating said component data that is not available to said first server from said first microprocessor-based device to said first server using said computer network; and, associating said component data with said software using said first server.

4. The method of claim 2, wherein said executing said second server algorithm comprises:

requesting said component data that is not available to said second server from said first microprocessor-based device using said computer network;

communicating said component data that is not available to said second server from said first server to said second server using said computer network; and, associating said component data with said software using said second server.

5. The method of claim 4, wherein said generating said second device update algorithm comprises:

communicating said component data from said second server to said second microprocessor-based device using said computer network; and, identifying which of said component data is not available to said second microprocessor based device.

6. The method of claim 5, wherein said executing said second device update algorithm comprises:

requesting said component data that is not available to said second microprocessor-based device from said second server using said computer network;

communicating said component data that is not available to said second microprocessor based device from said second server to said second microprocessor-based device using said computer network.

7. The method of claim 1, wherein said generating said second server update algorithm comprises:

communicating said component data from said first server to said second server using said computer network; and, identifying which of said component data is not available to said second server.

8. The method of claim 1, further comprising generating a plurality of server update algorithms by comparing said component data on said first server against data present on a plurality of servers and executing said plurality of server algorithms thereby duplicating said component data on said plurality of servers.

9. The method of claim 8, further comprising generating a plurality of device update algorithms by comparing said component data on select ones of said plurality of servers to data present on said plurality of device and installing said software application on each of said plurality of devices by respectively executing each of said plurality of device update algorithms.

10. A microprocessor-based device-readable medium having microprocessor-executable components for duplicating select data from a first microprocessor-based device to a second microprocessor-based device using a plurality of servers, the microprocessor-executable components comprising:

a first microprocessor-executable component being operable on said first microprocessor-based device and adapted to communicate first data being indicative of a difference between said select data and data available to a first of said servers from said first microprocessor-based device to said first server thereby duplicating said select data so as to be available to said first server;

a second microprocessor-executable component operable on each of said plurality of servers and adapted to communicate second data being indicative of a difference between said select data and data available to a second of said servers from said first microprocessor-based device to said second server thereby duplicating said select data so as to be available to said second server; and, a third microprocessor executable component operable on said second microprocessor-based device and adapted to communicate third data being indicative of a difference between said select data and data available to said second microprocessor-based device thereby duplicating said select data on said second microprocessor-based device.

11. The microprocessor-based device-readable medium of claim 10, wherein said select data includes a plurality of data items associated with application software.

12. The microprocessor-based device-readable medium of claim 11, wherein said plurality of data items includes items selected from the group consisting of: electronic files and environmental changes.

13. The microprocessor-based device-readable medium of claim 11, wherein said first component is further adapted to supply information which identifies each of said data items to said second component.

14. The microprocessor-based device-readable medium of claim 13, wherein said second component is adapted to receive said information and request said first data from said first component.

15. The microprocessor-based device-readable medium of claim 14, wherein said second component is adapted to associate said select data with said software application.

16. The microprocessor-based device-readable medium of claim 15, wherein said second component operating on said first server is adapted to supply information which identifies each of said data items to said second component operating on said second server.

17. The microprocessor-based device-readable medium of claim 16, wherein said second component operating on said second server is adapted to request said second data from said second component operating on said first server.

18. The microprocessor-based device-readable medium of claim 17, wherein said second component is further adapted to supply information which identifies each of said data items to said third component.

19. The microprocessor-based device-readable medium of claim 18, wherein said third component is further adapted to request said third data from said second component in response to said information which identifies each of said data items to said third component.

20. A method for maintaining a software application respectively operating on a plurality of microprocessor based devices each being accessible over a computer network, said method comprising:

identifying component data associated with said software application using a first electronic device;

generating a first server update algorithm by comparing said component data against data present on a first server and executing said first server algorithm thereby duplicating said component data on said first server;

generating a second server update algorithm by comparing said component data on said first server against data present on a second server and executing said second server algorithm thereby duplicating said component data on said second server;

generating a device update algorithm for each of said plurality of devices by respectively comparing said component data on said second server to data present on said devices and reinstalling any of said component data from said second server to said devices which is damaged or missing on said devices by executing said device update algorithm.

* * * * *